United States Patent
Hager et al.

(10) Patent No.: US 9,784,245 B2
(45) Date of Patent: Oct. 10, 2017

(54) WIND TURBINE GEARBOX

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT); Alexander Kari, Fuschl am See (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 59 days.

(21) Appl. No.: 14/763,383

(22) PCT Filed: Jan. 27, 2014

(86) PCT No.: PCT/AT2014/050029
§ 371 (c)(1),
(2) Date: Jul. 24, 2015

(87) PCT Pub. No.: WO2014/117196
PCT Pub. Date: Aug. 7, 2014

(65) Prior Publication Data
US 2015/0361962 A1    Dec. 17, 2015

(30) Foreign Application Priority Data

Jan. 30, 2013 (AT) .............................. A 50066/2013

(51) Int. Cl.
*F16H 57/08* (2006.01)
*F03D 11/00* (2006.01)
(Continued)

(52) U.S. Cl.
CPC .......... *F03D 11/0008* (2013.01); *F03D 15/00* (2016.05); *F03D 80/70* (2016.05);
(Continued)

(58) Field of Classification Search
CPC ...... F03D 80/70; F03D 15/00; F16C 33/1055; F16C 33/1045; F16H 57/08;
(Continued)

(56) References Cited

U.S. PATENT DOCUMENTS

| 2,318,114 A | 5/1943 | Tichvinsky |
| 3,112,116 A | 11/1963 | Seitz |

(Continued)

FOREIGN PATENT DOCUMENTS

| AT | 509 624 A1 | 10/2011 |
| CN | 101956676 A | 1/2011 |

(Continued)

OTHER PUBLICATIONS

International Search Report of PCT/AT2014/050028, dated Jun. 3, 2014.

(Continued)

*Primary Examiner* — Roger L Pang
(74) *Attorney, Agent, or Firm* — Collard & Roe, P.C.

(57) ABSTRACT

The invention relates to a wind turbine gearbox (1) having at least one gearwheel (2) which is mounted on an axle (5), wherein a bearing point with a plain bearing (4) is arranged between the gearwheel (2) and the axle (5), and wherein, in the axle (5), there is formed a recess for the supply of a lubricant to the plain bearing (4). In the region of a contact surface of the plain bearing (4), a groove (18) is formed in the gearwheel (2) or an intermediate space (7) is formed between the plain bearings (4), which groove or intermediate space is connected via at least one connecting line (16) to the surrounding atmosphere.

9 Claims, 2 Drawing Sheets

(51) Int. Cl.

| | | |
|---|---|---|
| *F16H 57/04* | (2010.01) | |
| *F16C 37/00* | (2006.01) | |
| *F16C 17/02* | (2006.01) | |
| *F16C 17/26* | (2006.01) | |
| *F16C 33/10* | (2006.01) | |
| *F03D 80/70* | (2016.01) | |
| *F03D 15/00* | (2016.01) | |

(52) U.S. Cl.
 CPC .............. *F16C 17/02* (2013.01); *F16C 17/26* (2013.01); *F16C 33/1045* (2013.01); *F16C 33/1055* (2013.01); *F16C 37/002* (2013.01); *F16H 57/043* (2013.01); *F16H 57/0479* (2013.01); *F16H 57/0486* (2013.01); *F16H 57/08* (2013.01); *F16C 2360/31* (2013.01); *F16H 57/082* (2013.01); *F16H 2057/085* (2013.01); *Y02E 10/722* (2013.01)

(58) Field of Classification Search
 CPC ............. F16H 57/0486; F16H 57/0479; F16H 57/043; F16H 57/082; F16H 2057/085
 See application file for complete search history.

(56) References Cited

U.S. PATENT DOCUMENTS

| | | | |
|---|---|---|---|
| 3,539,035 | A | 11/1970 | Wolkenstein |
| 3,736,705 | A | 6/1973 | Ryan et al. |
| 3,821,908 | A * | 7/1974 | Marsch ................ F16H 57/082 |
| | | | 475/159 |
| 3,822,607 | A | 7/1974 | Tharaldsen |
| 3,837,068 | A | 9/1974 | Dunn |
| 4,083,612 | A | 4/1978 | Olson |
| 4,271,928 | A | 6/1981 | Northern |
| 4,771,654 | A | 9/1988 | Shinjo et al. |
| 4,878,820 | A | 11/1989 | Doi et al. |
| 4,939,827 | A | 7/1990 | Iizuka |
| 5,102,379 | A * | 4/1992 | Pagluica ................ F16H 1/2836 |
| | | | 475/159 |
| 5,529,399 | A | 6/1996 | Holze |
| 5,743,658 | A | 4/1998 | Vollmer et al. |
| 5,947,608 | A | 9/1999 | Kim |
| 6,471,404 | B1 | 10/2002 | Gozdawa |
| 6,602,158 | B2 | 8/2003 | Wildeshaus |
| 6,663,289 | B1 | 12/2003 | Iljin |
| 6,695,480 | B1 | 2/2004 | Ramsay et al. |
| 6,929,402 | B1 | 8/2005 | Titus |
| 7,090,401 | B2 | 8/2006 | Rahman et al. |
| 7,390,125 | B2 | 6/2008 | Kennedy et al. |
| 7,540,664 | B2 | 6/2009 | Rahman et al. |
| 7,967,712 | B2 | 6/2011 | Nakamura et al. |
| 8,272,990 | B2 | 9/2012 | Hagedorn et al. |
| 8,298,108 | B2 | 10/2012 | Nishida et al. |
| 8,500,333 | B2 | 8/2013 | Osgood et al. |
| 8,578,806 | B2 | 11/2013 | Leimann et al. |
| 8,591,371 | B2 | 11/2013 | Dinter et al. |
| 8,840,521 | B2 | 9/2014 | Kari et al. |
| 9,011,010 | B2 | 4/2015 | Mueller et al. |
| 2008/0268997 | A1 | 10/2008 | Gooden |
| 2009/0247348 | A1 * | 10/2009 | Haupt ................ F16H 57/0427 |
| | | | 475/159 |
| 2011/0140448 | A1 | 6/2011 | Takeuchi et al. |
| 2011/0176907 | A1 | 7/2011 | Groves et al. |
| 2011/0223009 | A1 | 9/2011 | Grann et al. |
| 2011/0235210 | A1 | 9/2011 | Himeno et al. |
| 2012/0051915 | A1 | 3/2012 | Suzuki et al. |
| 2012/0108380 | A1 | 5/2012 | Dinter et al. |
| 2012/0224799 | A1 | 9/2012 | Wagner |

FOREIGN PATENT DOCUMENTS

| | | |
|---|---|---|
| CN | 201802752 U | 4/2011 |
| CN | 102223006 A | 10/2011 |
| DE | 19 85 822 U | 5/1968 |
| DE | 1 425 132 A1 | 12/1968 |
| DE | 1 650 681 A1 | 11/1970 |
| DE | 22 29 235 A1 | 1/1973 |
| DE | 2 357 399 A1 | 5/1974 |
| DE | 33 18 967 A1 | 2/1984 |
| DE | 38 17 312 A1 | 12/1988 |
| DE | 43 36 915 A1 | 5/1995 |
| DE | 195 46 974 A1 | 6/1997 |
| DE | 199 60 157 A1 | 6/2001 |
| DE | 11 2007 000 884 B4 | 2/2009 |
| DE | 20 2010 000914 U1 | 4/2010 |
| DE | 10 2010 000 809 A1 | 1/2011 |
| EP | 1 353 082 A1 | 10/2003 |
| EP | 2 063 139 A1 | 5/2009 |
| EP | 2 221 510 A1 | 8/2010 |
| EP | 2 284 420 B1 | 2/2011 |
| EP | 2 383 480 A1 | 11/2011 |
| EP | 2 489 902 A1 | 8/2012 |
| EP | 2 662 598 A1 | 11/2013 |
| FR | 1 110 347 A | 2/1956 |
| GB | 712 079 A | 7/1954 |
| JP | S48 27143 A | 8/1973 |
| JP | S48 96382 U | 12/1973 |
| JP | S58 49017 U | 4/1983 |
| JP | S61 75520 U | 5/1986 |
| JP | S61 241522 A | 10/1986 |
| JP | S62 151426 A | 7/1987 |
| JP | 2000-320649 A | 11/2000 |
| WO | 2011/127509 A1 | 10/2011 |
| WO | 2012029129 A1 | 3/2012 |

OTHER PUBLICATIONS

International Search Report of PCT/AT2014/050029, dated Jul. 17, 2014.

International Search Report of PCT/AT2014/050030, dated Jul. 8, 2014.

* cited by examiner

WIND TURBINE GEARBOX

CROSS REFERENCE TO RELATED APPLICATIONS

This application is the National Stage of PCT/AT2014/050029 filed on Jan. 27, 2014, which claims priority under 35 U.S.C. §119 of Austrian Application No. A 50066/2013 filed on Jan. 30, 2013, the disclosure of which is incorporated by reference. The international application under PCT article 21(2) was not published in English.

The invention relates to a wind turbine gearbox comprising at least one gearwheel, which is mounted on an axle, wherein a bearing point with a plain bearing is arranged between the gearwheel and the axle, and wherein in the axle a recess is formed for supplying a lubricant to the plain bearing. Furthermore, the invention relates to a wind turbine gearbox comprising at least one gearwheel which is mounted on an axle, wherein a bearing point with plain bearings is arranged between the gearwheel and the axle, in which plain bearings are spaced apart from one another in axial direction forming an intermediate space, and wherein a recess is formed in the axle for supplying a lubricant to the plain bearings.

In wind turbines gearboxes are used to translate the relatively slow rotational movement of the wind turbine rotor into higher speeds in order to operate a generator for generating electricity. Mostly roller bearings are used in said gearboxes, as the supply of lubricants of plain bearings is a problem because of the larger dimensions of the gearbox and the low speeds in this section. In particular, in the start-up phase the lubricant is only conveyed inadequately to the bearing points.

In EP 2 284 420 B1 different types of gears and gear configurations are described for use in wind turbines. In paragraphs [0002] to [0013] of this document the demands and associated problems of having individual bearings for the gear shafts or axles are described. Reference is therefore made to this document to avoid repetition.

In the prior art plain bearing solutions have already been described for the gear systems of wind turbines.

Thus a planetary gear for a wind turbine is known for example from EP 2 383 480 A1. The latter comprises at least one sun gear, a hollow gear and a planetary support, in which a plurality of planet gears are mounted. For mounting the planetary gears a plurality of radial plain bearings are provided which each comprise a sleeve made from a plain bearing material and which is secured either as an inner ring on a planetary gear axle or mounted as an outer ring in a bore of a planetary gear, wherein an associated outer or inner bearing ring is formed either by the bore of the planetary gear or the planetary gear axle. Furthermore, a plurality of axial plain bearings are provided for mounting the planetary gears which each comprise a first bearing element made from a plain bearing material which is applied to a contact surface between a planetary support flank or the end side of a planetary gear, wherein an associated second bearing element is formed either by the end side of the planet or by the planetary support flank.

Three different possibilities are described in this document for lubricating the plain bearing.

1. Pressure lubrication for the loaded operation of the gear. The plain bearings are supplied with pressure oil from the planetary gear axle. The pressure oil supply is provided about 90° before the maximum loading zone of the bearing.

2. Immersion lubrication for the load-free operation of the gearbox. The plain bearings are supplied with oil via an oil reservoir in the planetary gear axle. The oil reservoir is filled with oil by immersing the planetary gear axle into the oil sump and conveys said oil to the plain bearing. The oil supply is performed about 110° before the maximum loading area of the bearing. By means of the hydraulic connection of the pressure lubrication and immersion lubrication the discharge of oil is ensured.

3. Oil store for the load-free operation of the gearbox. The radial plain bearings are provided with oil storing edges at the end sides of the planetary gears so that there is always a defined oil level in the plain bearing. In this way the lubrication of the radial plain bearing is ensured in the load-free state.

For the pressure lubrication of the axial and/or radial plain bearing an oil distributor ring can be provided which radially surrounds a sun gear axle and has a connection to an oil supply channel in a gear housing, wherein at least one oil distribution channel is provided in the planet support which is connected to the oil distribution ring and ends at a lubrication point for a planetary gear bearing. In this case in the planetary gear axles two bores can be provided coming from an oil distribution channel section parallel to the planetary gear axle and extending radially, and the sleeves each have two lubricant collecting devices, between which a peripheral lubricant supply groove is formed.

For the immersion lubrication of the axial and/or radial plain bearing a bore can be provided in the planetary gear axles which forms an oil reservoir which can be filled by immersing the respective planetary gear axle into an oil sump. In this case a radially extending bore can be provided in the planetary gear axles which comes from the oil reservoir and ends at the sleeve.

The sleeves can also comprise a lubricant collecting device formed by a recess on the sleeve in an area in which the bore coming from the oil reservoir ends.

From AT 509 624 B1 a planetary gear is known for a wind turbine with a plurality of planetary gears which are mounted respectively by a bearing element on an axle, wherein the bearing element is a multilayered plain bearing. In particular, two spaced apart bearing sleeves are provided per planetary gear.

In the axle guided by the gear wheel for supplying and removing a lubricants for the bearing element at least one channel and/or at least one bore can be provided. By specifically guiding a fresh oil supply directly into the lubricant gap in the region of the main loading area and by the specific removal it is possible to avoid a smaller increase in temperature during the operation of the gearbox despite the high loading and mixed frictional characteristics. By optimizing the throughput of lubricant oil to a minimum—the bearing is a hydrodynamically operated plain bearing without hydrostatic support—the supply pressures and supply amounts of lubricant oil and the losses at each of the roller bearing solutions, which normally have clear advantages with regard to the losses, are compensated.

The underlying objective of the present invention is to improve the lubricant supply to a plain bearing for a wind turbine gearbox.

The objective is achieved in the aforementioned wind turbine gearbox in that in the region of a bearing surface of the plain bearing on the gearwheel a groove is formed in the gearwheel and the groove is connected via at least one connecting line to the surrounding atmosphere. Furthermore, the objective is achieved in the aforementioned wind turbine gearbox in that the intermediate space is connected via at least one connecting line to the surrounding atmosphere.

It is as advantage that by connecting the groove or intermediate space to the surrounding atmosphere, i.e. the ambient pressure, it is possible to improve the distribution of the supplied lubricant to the bearing point or points. As the groove or the intermediate space is connected to the ambient pressure the restricting effect and the resulting lower oil throughput in very wide bearings is reduced—as viewed in axial direction—, whereby the volume flow of lubricant can be increased through the bearing point. Compared to the solution known from AT 509 624 B1 of bearing lubrication in such gearboxes the accumulating counter pressure opposing the lubricant is reduced. Said counter pressure can cause the lubricant to escape via an end side of the (respective) plain bearing. As a result, the bearing can overheat because of the reduced flow of lubricant and this may result in damage to the bearing. This is prevented effectively in the wind turbine gearbox according to the invention. By reducing the restricting effect it is also possible that in the embodiment variant with a plurality of plain bearings arranged next to one another for each bearing point only one lubricant supply is provided, whereby the lubricant supply system can be simplified further.

According to one embodiment variant of the wind turbine gearbox the connecting line of the groove or the intermediate space to the surrounding atmosphere is formed in the gearwheel. In this way, as the connecting line rotates with the gearwheel only one section of the intermediate space is in direct contact with said connecting line, at the moment when the connecting line covers this section. It is thus possible to achieve a better coordination of the reduction of the restricting effect of the intermediate space, by means of the size of the connecting line—and possibly the number of connecting lines per gearwheel.

In the preferred embodiment variant of the invention however the connecting line is formed in the shaft, wherein if necessary a connecting line can also be provided in the gearwheel. By embedding the connecting line into the shaft on the one hand a simpler, more compact structure of the oil supply system is achieved for the bearing points. On the other hand in this way however the weakening of the gearwheel by the connecting line is avoided.

In this way the shaft itself can be configured at least partly as a hollow axle, whereby the production of the oil supply system for the bearing points can be simplified.

A hollow axle is defined in the terms of the present invention as a shaft which comprises a bore along its longitudinal center axis. The term "at least partly" means that the bore can be configured as a blind bore.

It is also an advantage if at least one recess is arranged in the area of each plain bearing for supplying the lubricant. In this way a bearing point is not supplied with lubricant via another bearing point. In other words the bearing of the gearwheel is split into at least two bearing points functioning separately from the point of view of the lubricant flow. This also applies in the embodiment variant with only one plain bearing, as in this case the two bearing points can be considered as the two sections of the plain bearing lying next to the grooves. In this way a better supply of lubricant to the bearing point can be achieved, whereby the cooling effect of the lubricant can be improved and whereby the connection of the groove or the intermediate space to the ambient pressure can be improved with respect to the volume flow of lubricant.

It is also an advantage if via the connecting line in the axle at least a portion of the lubricant can be removed from the area of the plain bearing, as in this way the structural effort of removing the lubricant is simplified.

In the preferred embodiment of the wind turbine gearbox it is possible for the ratio of the width of the bearing point in axial direction to the diameter of the shaft in radial direction to be a maximum of 2. It is thus possible that the volume flow of lubricant can be limited to a predefinable maximum value. In other words in this way it is possible to prevent the flow of lubricant through the bearing points being too high.

According to additional embodiment variants of the wind turbine gearbox the width of the groove or the intermediate space in axial direction is selected from a range of 5% to 90% of the width of a plain bearing in axial direction and/or the height of the groove or the intermediate space in radial direction is selected from a range of 5% to 100% of the wall thickness of the plain bearing, whereby the cooling of the bearing point by the lubricant can be adjusted easily to the predefined dimensions of the wind turbine gearbox.

For a better understanding of the invention the latter is explained in more detail with reference to the following Figure.

In a schematically much simplified representation:

Figure 1:
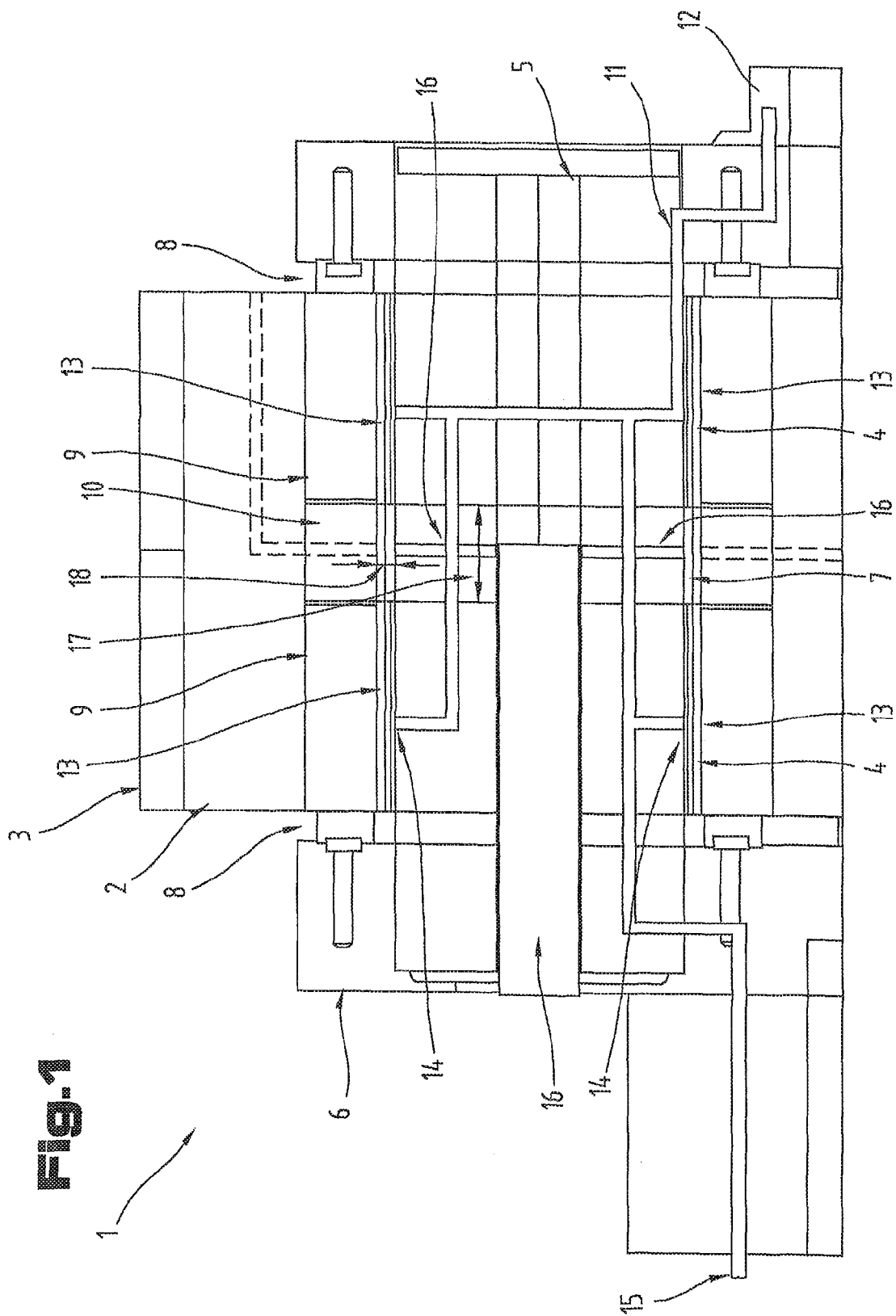
FIG. 1 shows a cross section of a section of a wind turbine gearbox.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a cross section of a section of a wind turbine gearbox 1. The wind turbine gearbox 1 is designed in particular in the form of a (single) planetary gear.

As already known, wind turbines comprise a tower with a gondola arranged at its upper end, in which the rotor with the rotor blades is mounted. The said rotor is operatively connected via a gearbox to a generator, which is also located in the gondola, wherein by means of the gearbox the low speed of the rotor is translated into a higher speed of the generator rotor. As such embodiments of wind turbines form part of the prior art, reference is made at this point to the relevant literature.

The wind turbine gearbox 1 comprises at least one gearwheel 2. Said gearwheel 2 is arranged in the wind turbine gearbox 1 in meshing engagement between a second and a third gearwheel (both not shown). In addition, the at least one gearwheel 2 comprises an outer spur gearing 3.

In the embodiment of the wind turbine gearbox 1 as a planetary gear, in particular as the main gearbox of a wind power plant, the second gearwheel is designed as a sun gear with a spur gearing, which is connected in a rotationally secure manner to a shaft which leads to the generator rotor. The sun gear is usually surrounded by a plurality of gear wheels 2, the planetary gears, for example two, preferably three or four.

The third gearwheel is designed as a hollow gear which surrounds the at least one gearwheel 2 or the gear wheels 2 in radial direction and which on an inner surface also comprises at least partly a gearing which is meshing engagement with the outer spur gearing 3 of the gearwheel 2 or the gear wheels 2. The hollow gear is connected in a rotationally secure manner to a rotor shaft of the rotor of the wind turbine or is connected in a rotationally secure manner to the housing of the wind turbine gearbox 1.

The toothings of the gear wheel in the wind turbine gearbox 1 can be configured to be straight or oblique.

The at least one gearwheel 2 (in the following only one gearwheel 2 is described, wherein said embodiments can be applied to all or a plurality of gear wheels 2) is mounted by a plurality of plain bearings 4, in particular multi-layered plain bearings, on an axle 5, i.e. for example a planetary shaft (the so-called planetary axle). Said axle 5 can either be designed in one piece with at least a part of a gearwheel support 6, in particular a planet carrier, or it is inserted as a separate component into bores of the gearwheel support 6.

It should be noted that it is possible to provide not only single stage embodiments of such wind turbine gearboxes 1 within the scope of the invention, but also multi-stage embodiments, for example two or three-stage mechanisms are possible, whereby additional spur gearing stages can be integrated into at least one gearwheel 2, in particular a planetary gear. In addition, parallel gearboxes, as described for example in the aforementioned EP 2 284 420 B1, are also possible within the scope of the invention. Reference is therefore made to this document, which in this regard is associated with the present description. Thus the wind turbine gearbox 1 can comprise a single planetary gear and a parallel two or multi-stage planetary gear or generally a plurality of planetary gears.

Furthermore, it should also be mentioned that, although preferred, the invention is used not only in the planetary gears of wind turbines, but can be used generally in the gearboxes of wind turbines, in particular for translating the slow speed of the rotor of a wind turbine into a higher speed.

The plain bearings 4 are arranged spaced apart from one another in axial direction forming an intermediate space 7.

The plain bearings 4 can be designed in principle in the form of plain bearing half shells. Preferably however, the latter are in the form of bearing bushes. The bearing bush of a gearwheel 2 is connected in a rotationally secure manner to the latter, for example via a press-fit or by other suitable methods. Alternatively, it is possible for the plain bearing 2 to be connected in a rotationally secure manner to the axle 5.

A multilayered plain bearing consists at least of a support layer and a plain layer which is applied onto the support layer. The plain layer thereby forms a running surface for the axle 5 or the gearwheel 2, according to the aforementioned arrangement.

The multilayering of the plain bearing 4 can also be achieved in that the axle 5 is coated in the region of the bearing of the gearwheel 2 and/or the gearwheel 2 itself in the region of the bore mounting the axle 5 with a material for a plain layer. In this case the support layer of the multilayered plain bearing is formed by the material of the gearwheel 2, for example steel and/or the material of the axle 5, for example steel.

In addition to this two-layered embodiment of the multilayered plain bearing, it is also possible within the scope of the present invention that intermediate layers are arranged between the plain layer and the support layer, for example a bearing metal layer and/or at least one bonding layer and/or a diffusion barrier layer.

Examples of materials for the individual layers of the multilayered plain bearing are described in the aforementioned AT 509 624 B1, which is referred to here and in this regard is associated with the present description.

In axial direction in addition to a plain bearing 4 a run-on disc 8 can be provided between the plain bearings 4 or the gearwheel 2 and the gearwheel support 6.

The sliding layer of the plain bearing 4 can be raised up into the end face to the run-on discs 8 so that the plain bearings 4 also perform an axial bearing function in addition to the radial bearing function.

In addition, the gearwheel 2 can comprise at the end sides—as viewed in axial direction—peripheral annular grooves 9, in which the plain bearings 2 are arranged. An annular web 10 of the gear wheel 2 pointing in the direction of the axle 5 and arranged between the plain bearings 4 forms the upper boundary of the intermediate space 7. Alternatively, a spacing element can be arranged between the plain bearings 2 and above the intermediate space 7 which spacing element is connected in particular to the gearwheel 2.

FIG. 1 also shows the supply of lubricant to the running surfaces of the plain bearing 4. In addition, by means of a bore 11 or a channel-like recess in the axle 5, lubricant, in particular lubricant oil, is supplied from a lubricant inlet 12, which is connected to a not shown lubricant reservoir, into areas 13 of the running surfaces of the plain bearings 4, from which the lubricant is distributed over at least almost the whole running surface. The bore 11 or the recess comprises a plurality of sections which have in particular either a radially outwardly pointing or axially running direction. Furthermore, a part of the bore 11 or the recess can also be guided by the gearwheel support 6, as shown in FIG. 1.

The precise direction of the sections of the bore 11 or the recess corresponds to the mechanical requirements of the wind turbine gearbox 1 and/or to the ease of production.

As shown in FIG. 1, the bore 11 or the recess comprises at least one branch in order to distribute the lubricant to all of the bearing points, so that each of the two plain bearings 4 has at least one separate lubricant supply—it should be mentioned that also more than two plain bearing (bushes) can be provided per gearwheel 2. If necessary a plurality of lubricant outlets 14 to the bearing point can be arranged distributed over the circumference of the plain bearing 4, for example two or three or four, etc. Alternatively or in addition, a plurality of lubricant outlets 14 can also be arranged behind one another in axial direction.

It is also possible for the lubricant to be supplied from two sides—as viewed in axial direction—i.e. an additional lubricant inlet 15 being formed in the gearwheel support 6 or in the axle 5. For example, at least one lubricant inlet 15 can be arranged on the rotor side (in FIG. 1 left of the gearwheel 2) and on the generator side (in FIG. 1 right of the gearwheel 2), whereby a plurality of lubricant inlets 15 can also be arranged on at least one side (or on both sides).

Unlike the embodiment of the lubricant supply shown in AT 509 624 B1 in the wind turbine gearbox 1 according to the invention the lubricant is not supplied to the intermediate space 7 delimited by the plain bearing 4, the axle 5 and the gearwheel 2, but underneath the plain bearing 2, as shown in FIG. 1. As described in the prior art the lubricant outlets 14 preferably end directly below the running surfaces 16 of the plain bearing 4.

The axle 5 can comprise a recess in the supply area of the lubricant, i.e. a step in the section of the surface, in order to thus support the distribution of the lubricant. By means of this step a larger cross section of the lubricant outlet 14 is achieved.

It should be mentioned in particular at this point that the supply of lubricant can also be performed exclusively via the axle 5, i.e. the gearwheel support 6 has no bore or channel-like recess for this.

To improve the distribution of the lubricant over at least almost all of the running surfaces the intermediate space 7 is connected via at least one connecting line 16 to the surrounding atmosphere. Preferably, the connecting line 16 runs in the axle 5, whereby at least one radial section is formed below the intermediate space 7 which opens into an axial section in the axle 5. The latter runs in the direction of the longitudinal middle axis through the axle 5 into an axial end face of the shaft.

As preferably the intermediate space 7 is designed to run over the whole circumference of the shaft, preferably also a plurality of radial sections of the connecting line 16 are formed, for example two as shown in FIG. 1, or three or four, etc.

It is also possible that the axial section of the connecting line 16 runs in the area of the longitudinal center axis of the axle 5 so that the latter is thus designed at least partly as a hollow axle.

According to one embodiment variant the axle 5 can be designed completely as a hollow axle so that the axial section of the connecting line 16 extends up to both end faces of the axle 5—as viewed in axial direction.

Alternatively or in addition, at least one connecting line 16 can also be formed in the gearwheel 2, as shown by a dashed line in FIG. 1.

It is also possible within the scope of the invention for a plurality of radial sections of the connecting line 16 to be arranged next to one another in axial direction below the intermediate space 7.

The diameter of the radial sections of the connecting line 16 directly underneath the bearing points is preferably selected from a range of 5 mm to 30 mm, in particular from a range of 10 mm to 20 mm. Preferably, the total cross section of the connecting lines 16 is as large as the total cross section of the oil supply lines.

Furthermore, the cross section of the connecting line 16 can be designed to be round, oval, rectangular, square or polygonal, etc.

To remove the lubricant from the bearing areas independent removal lines can be provided (not shown). However, at least a portion of the lubricant can also be removed via the connecting line in the axle 5.

It is also preferable, if the ratio of the width of the bearing point in axial direction to the diameter of the axle 5 in radial direction is a maximum of 2. In particular, said ratio can be selected from a range of 1 to 2, preferably from a range of 0.3 to 0.8.

In addition, preferably the width 17 of the intermediate space 7 in axial direction is selected from a range of 5% to 90%, in particular from a range of 10% to 50%, of the width of a plain bearing 4 in axial direction.

Furthermore, preferably the height 18 of the intermediate space 7 in radial direction is selected from a range of 5% to 100%, in particular from a range of 10% to 70%, of the wall thickness of the plain bearing 4.

All of the dimensions of the ratios are in mm.

Figure 2:
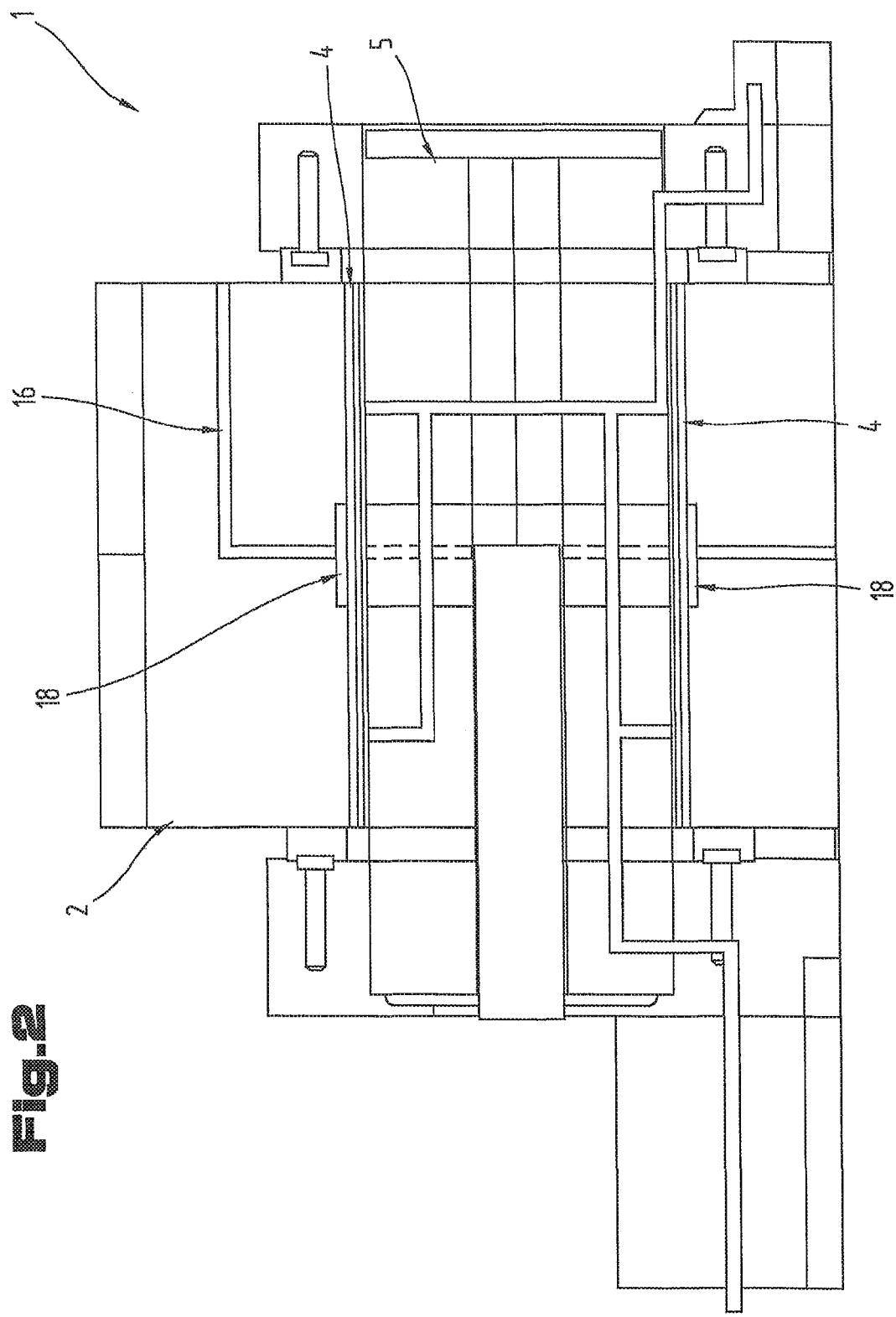
FIG. 2 shows a cross section of a section of an embodiment variant of the wind turbine gearbox.

It is also possible within the scope of the invention that the two or a plurality of plain bearings 4 are combined into a plain bearing 4, in particular only one plain bearing 4 is provided in the form of a plain bearing bush, as shown in FIG. 2.

In this case the intermediate space 7 represented in FIG. 1 can be formed by at least one groove 18 in the bearing surface of the gearwheel 2. The at least one groove 18 runs in circumferential direction in the body of the gearwheel 2.

Furthermore, said embodiment variant of the wind turbine gearbox 1 preferably corresponds to that of FIG. 1. In this embodiment variant the groove 18 is connected via at least one connecting line 16 to the surrounding atmosphere. The at least one connecting line 16 can be guided through the gearwheel 2 or—as shown by a dashed line in FIG. 2—through the plain bearing 4 and the axle 5, wherein both variants are possible in one embodiment of the wind turbine gearbox 1.

Lastly, as a point of formality it should be noted that for a better understanding of the structure of the wind turbine gearbox 1 the latter and/or its components have not been represented to scale and/or have been enlarged and/or reduced in size.

LIST OF REFERENCE NUMERALS 1 wind turbine gearbox
2 gearwheel
3 outer spur gearing
4 plain bearing
5 axle
6 gearwheel support
7 intermediate space
8 run-on disc
9 annular groove
10 annular web
11 bore
12 lubricant inlet
13 section
14 lubricant outlet
15 lubricant inlet
16 connecting line
17 width
18 groove

The invention claimed is:

1. A wind turbine gearbox having at least one gearwheel, which is mounted on an axle, wherein a bearing point with a plain bearing is arranged between the gear-wheel and the axle, wherein in the axle a recess is formed for supplying a lubricant to the plain bearing, wherein in the region of a bearing surface of the plain bearing on the gearwheel a groove is formed in the gearwheel and the groove is connected via at least one connecting line to the surrounding atmosphere, and wherein the connecting line is formed in the axle.

2. The wind turbine gearbox as claimed in claim 1, wherein the axle is designed at least partly as a hollow axle.

3. The wind turbine gearbox as claimed in claim 1, wherein at least a portion of the lubricant can be removed from the plain bearing area via the connecting line in the axle.

4. The wind turbine gearbox as claimed in claim 1, wherein a ratio of a width of the bearing point in an axial direction to a diameter of the axle in a radial direction is a maximum of 2.

5. The wind turbine gearbox as claimed in claim 1, wherein a width of the groove in an axial direction is selected from a range of 5% to 90% of a width of the plain bearing in the axial direction.

6. The wind turbine gearbox as claimed in claim 1, wherein a height of the groove in a radial direction is selected from a range of 5% to 100% of a wall thickness of the plain bearing.

7. A wind turbine gearbox having at least one gearwheel, which is mounted on an axle, wherein a bearing point with plain bearings is arranged between the gear-wheel and the axle, which plain bearings are spaced apart from one another in an axial direction forming an intermediate space, wherein in the axle a recess is formed for supplying a lubricant to the plain bearings, wherein the intermediate space is connected to the surrounding atmosphere via at least one connecting line, wherein the connecting line is formed in the axle, and wherein in the region of each plain bearing at least one recess is provided for supplying the lubricant.

8. The wind turbine gearbox as claimed in claim 7, wherein a width of the intermediate space in the axial direction is selected from a range of 5% to 90% of a width of a plain bearing in the axial direction.

9. The wind turbine gearbox as claimed in claim 7, wherein a height of the intermediate space in a radial direction is selected from a range of 5% to 100% of a wall thickness of a plain bearing.

* * * * *